United States Patent
Rosa et al.

(10) Patent No.: US 8,292,494 B2
(45) Date of Patent: Oct. 23, 2012

(54) METHOD OF CALIBRATING A KNOB FOR USE WITH AN ADJUSTABLE CONTROL DEVICE AND A KNOB CALIBRATED THEREBY

(75) Inventors: Paulo Jorge Rosa, Etobicoke (CA); David Popowich, Brampton (CA); Joseph Felix Scheuring, III, Richmond Hill (CA)

(73) Assignee: Garland Commercial Industries LLC, Freeland, PA (US)

( * ) Notice: Subject to any disclaimer, the term of this patent is extended or adjusted under 35 U.S.C. 154(b) by 992 days.

(21) Appl. No.: 12/287,533

(22) Filed: Oct. 10, 2008

(65) Prior Publication Data

US 2009/0139367 A1 Jun. 4, 2009

Related U.S. Application Data

(60) Provisional application No. 60/998,392, filed on Oct. 10, 2007.

(51) Int. Cl.
  *G05G 1/10* (2006.01)
  *G01K 15/00* (2006.01)
  *F24C 3/12* (2006.01)
  *F24C 7/08* (2006.01)

(52) U.S. Cl. ................. 374/1; 116/292; 74/553

(58) Field of Classification Search ........ 374/1; 74/533; 116/230, 292, 294, DIG. 21, DIG. 23; 403/362; D8/DIG. 2

See application file for complete search history.

(56) References Cited

U.S. PATENT DOCUMENTS

| | | | | |
|---|---|---|---|---|
| 1,537,227 A * | 5/1925 | De Witt | ............................ | 403/68 |
| 2,179,281 A * | 11/1939 | Coultrip | ..................... | 236/99 R |
| 3,109,411 A * | 11/1963 | Fuhrman | ...................... | 116/292 |
| 3,109,412 A * | 11/1963 | Fuhrman et al. | ............. | 116/312 |
| 3,154,051 A * | 10/1964 | Durst et al. | ................... | 116/312 |
| 3,176,541 A * | 4/1965 | Keeling, Sr. et al. | .......... | 74/553 |
| 3,247,701 A * | 4/1966 | Lawler | ......................... | 73/1.88 |
| 3,769,933 A * | 11/1973 | Fox | .............................. | 116/336 |
| 3,783,675 A * | 1/1974 | Kreps | ............................ | 374/1 |
| 4,343,564 A * | 8/1982 | Francis | ......................... | 403/362 |
| 4,417,483 A * | 11/1983 | Howie, Jr. | ..................... | 74/553 |
| 4,433,218 A * | 2/1984 | Provencher | ................ | 200/11 R |
| 4,445,455 A * | 5/1984 | Cannon | ......................... | 116/216 |
| 4,446,811 A * | 5/1984 | Howie, Jr. | ..................... | 116/309 |
| 4,499,630 A * | 2/1985 | Harris et al. | ................... | 16/441 |
| 4,571,111 A * | 2/1986 | Keogh | .......................... | 403/282 |
| 4,800,466 A * | 1/1989 | Bauer et al. | .................... | 362/26 |
| 4,842,009 A * | 6/1989 | Reback | .................... | 137/315.15 |
| 4,984,931 A * | 1/1991 | Struthers et al. | ............. | 403/362 |
| 5,025,826 A * | 6/1991 | Schoepe et al. | ........... | 137/315.15 |
| 5,345,838 A * | 9/1994 | Howie, Jr. | ..................... | 74/553 |
| 5,459,919 A * | 10/1995 | Howie, Jr. | ..................... | 29/437 |
| 6,568,036 B1 * | 5/2003 | Howie, Jr. | ...................... | 16/441 |

* cited by examiner

*Primary Examiner* — R. A. Smith

(74) *Attorney, Agent, or Firm* — Ohlandt, Greeley, Ruggiero & Perle, L.L.P.

(57) ABSTRACT

A method of calibrating an adjustable control device using a knob assembly with adjustable temperature scale. A knob and a bezel that bears the temperature scale are assembled and the temperature scale is calibrated without physically changing any internals within the adjustable control device. The knob and bezel are secured to the adjustable control device so that the knob and bezel assembly can transmit an input load from a user through to the adjustable control device and so that the bezel can be rotated relative to the knob which remains fixed to an input shaft of the control for calibration purposes.

18 Claims, 3 Drawing Sheets

METHOD OF CALIBRATING A KNOB FOR USE WITH AN ADJUSTABLE CONTROL DEVICE AND A KNOB CALIBRATED THEREBY

RELATED APPLICATION

This application claims the priority of U.S. Provisional Application Ser. No. 60/998,392 filed on Oct. 10, 2007, the entire contents of which are hereby incorporated by reference.

BACKGROUND OF THE INVENTION

1. Field of the Invention

The present disclosure relates to a knob assembly that interfaces with an adjustable control device that controls a variable. In particular, the present disclosure in a preferred embodiment relates to a calibratable oven knob that interfaces with an adjustable control thermostat.

2. Description of Related Art

Traditional oven and griddle assemblies are manufactured with a removable knob that fits over a valve stem of a thermostatic control. The knob is typically splined or keyed to the stem so that force applied to the knob by the end user can be transmitted through to the control to affect the output temperature of a cooking appliance. Examples of common thermostatic controls include the FDO control and the BJWA control available from Invensys. Some controls, such as the FDO control and the BJWA control, provide manufacturer backed means of field calibration that allow a service technician to make a manual adjustment and change the calibration of the thermostat by some amount. In the case of the FDO and BJWA controls, this adjustment is typically ±10 degrees Fahrenheit. It is common for the service technician to have to remove the knob before such an adjustment can be made.

However, not all thermostat controls provide a capability for a field calibration as desired by the end consumer. Therefore, there is a need to provide an alternate manner of calibration without impacting on the warranty of the thermostat control.

SUMMARY OF THE INVENTION

The present disclosure provides a calibratable knob and temperature scale that can be accurately and positively aligned during assembly with an adjustable control device.

A method of the present disclosure calibrates a knob and a temperature scale with an adjustable control that controls heating of a cooking appliance. The method comprises securing the knob and the temperature scale to a rotatable element of the adjustable control device so that moving the knob also moves the temperature scale and the rotatable element. The knob, and temperature scale, is set to a predetermined temperature. The resulting temperature of the cooking appliance is measured. When the measured temperature reaches a steady state temperature, it is determined if the steady state temperature is equal to the predetermined temperature selected. If the steady state temperature is not equal to the predetermined temperature, the knob and temperature scale is moved to heat or cool the cooking appliance until the steady temperature is equal to the predetermined temperature. One of the knob and temperature scale is moved relative to the other to the predetermined temperature on the temperature scale.

In one embodiment of the method of the present disclosure, the knob and temperature scale are moved by an amount about equal to a difference between the steady state temperature and the predetermined temperature to heat or cool the cooking appliance.

In another embodiment of the method of the present disclosure, the method further comprises loosening the temperature scale relative to the knob before moving one of them; and securing the knob and the temperature scale to one another after the one of them is moved.

In another embodiment of the method of the present disclosure, the method further comprises an indicator that is fixed relative to the knob and the temperature scale and the adjustable control device.

In another embodiment of the method of the present disclosure, the indicator is located on the adjustable control device.

In another embodiment of the method of the present disclosure, the temperature scale has an amount of angular rotation in a range from about 10 degrees to about 30 degrees.

In another embodiment of the method of the present disclosure, the temperature scale is located on an annular disk that is rotatable relative to the knob when loosened and rotatable with the knob when secured to the knob.

In another embodiment of the method of the present disclosure, the method further comprises turning the cooking appliance on so that the adjustable control device controls a heating system of the cooking appliance to heat and cool the cooking appliance.

A knob assembly of the present disclosure comprises a knob that comprises a handle portion and a hub portion. The hub portion comprises a control element receiving socket at an outer end of the knob capable of transmitting an applied load. The handle portion comprises a cylindrical base and an indented blade portion capable of receiving the applied load. A member is coupled to the knob. A temperature scale is located on a surface of the member. One of the member and knob is movable relative to the another.

In one embodiment of the knob assembly of the present disclosure, the member is an annular disc.

In another embodiment of the knob assembly of the present disclosure, at least one curvilinear slot faces the outer end and at least one screw extends through the curvilinear slot to lock and unlock the annular disc to the knob. The annular disc when unlocked is rotatable with respect to the knob in an angular range determined by a size of the curvilinear slot.

In another embodiment of the knob assembly of the present disclosure, at least one additional curvilinear slot faces the outer end and at least one additional screw extends through the additional curvilinear slot. The one screw and the additional screw lock and unlock the annular disc to the knob.

In another embodiment of the knob assembly of the present disclosure, the surface of the annular disc comprises a bezel.

In another embodiment of the knob assembly of the present disclosure. the handle portion is manufactured from phenolic.

In another embodiment of the knob assembly of the present disclosure, the bezel is manufactured from cast aluminum.

In another embodiment of the knob assembly of the present disclosure. the control element is a force transmitting element of an adjustable control device, further comprising a set screw that positively locks the knob to the control element of the adjustable control device.

In another embodiment of the knob assembly of the present disclosure, the control element comprises a knob that is locked to a rotatable stem of the adjustable control device.

DETAILED DESCRIPTION OF THE INVENTION

Figure 1:
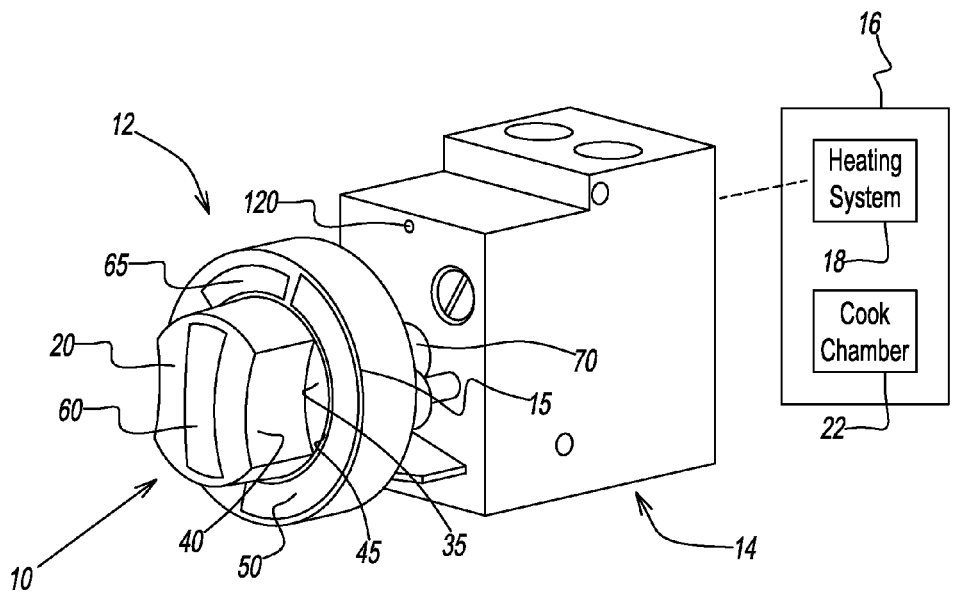
FIG. 1 is a perspective view of the calibratable knob assembly of the present disclosure attached to an adjustable control device.

Referring to FIG. 1, a calibratable knob assembly 12 is shown attached to an adjustable control device 14. Adjustable control device 14 controls a variable such as temperature, pressure, humidity, flow or other variable. By way of example and completeness of description, adjustable control device 14 will be described herein for the application of controlling a temperature of a stove, oven, griddle, or other cooking appliance.

In the illustrated embodiment, adjustable control device 14 is connected to a cooking appliance 16. Cooking appliance 16 comprises a heating system 18 and cook chamber 22. In particular, adjustable control device 14 is connected to heating system 18 to heat and cool cook chamber 22.

Figure 4:
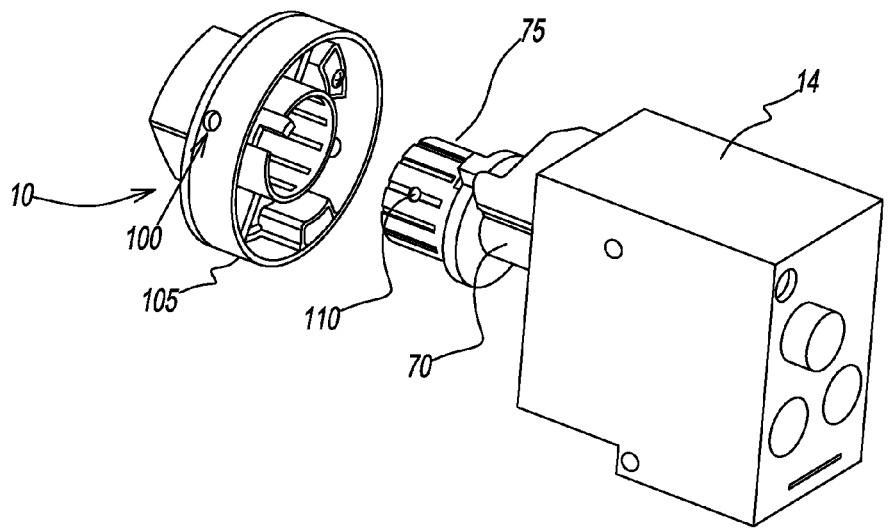
FIG. 4 is a perspective view depicting the calibratable knob assembly and adjustable control device detached from on another.

Referring to FIGS. 1 and 4, calibratable knob assembly 12 is mounted on the end of a rotatable member 70 of adjustable control device 14. In a preferred embodiment, the rotatable member comprises a rotatable shaft or stem controlling a gas valve, thermostat or an electrical rheostat that controls the temperature of cooking appliance 16. For example, adjustable control device 14 is a model 630 modulating thermostat available from SIT La Precise S.p.A. of Padova, Italy.

Figure 2:
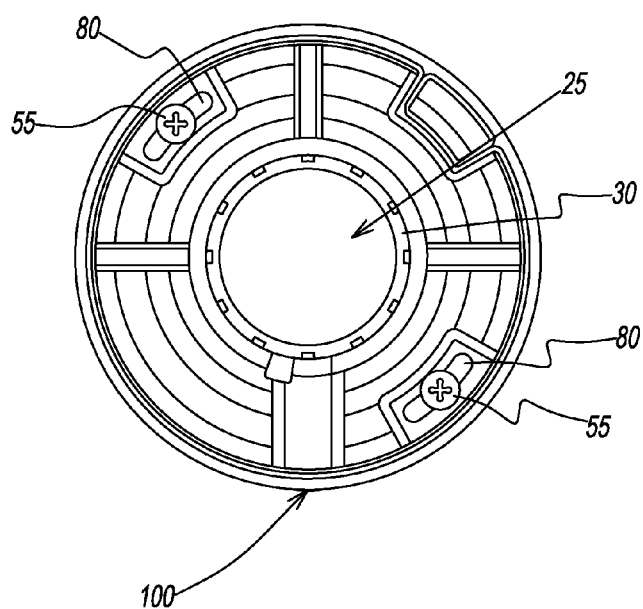
FIG. 2 is a rear view of the calibratable knob assembly of FIG. 1.

Calibratable knob assembly 12 comprises a knob 10 and an annular member or disc 15 that form a two-piece assembly. Knob 10 comprises a handle portion 20 and a hub portion 25 (FIG. 2). Hub portion 25 comprises a control shaft receiving socket 30 at its outer end. Handle portion 20 comprises a cylindrical base 35, an indented blade portion 40 and an axially facing annular rim 45 surrounding cylindrical base 35. Handle portion 20 is manufactured from any suitable material, an example of which is phenolic. Annular member 15 is manufactured from any suitable material, for example a metal such as aluminum or any suitable plastic. Annular member 15 comprises a suitable surface that bears a temperature scale 50. The surface may be flat, inclined or other shape dependent on human viewing desirability. In the illustrated embodiment, annular member 15 has an inclined surface and is sometimes referred to herein as bezel 15.

Temperature scale 50 comprises a secondary piece that can be attached to bezel 15 using an adhesive. In other exemplary embodiments, temperature scale 50 is molded as an integral part of bezel 15, printed directly on the surface of bezel 15, or secured to bezel 15 using any other method known presently or in the future by one skilled in the art. As shown in FIG. 2, at least two curvilinear slots 80 are disposed in the rear of bezel 15 in alignment with mating screw holes (not shown) disposed in the rear of knob 10. Bezel 15 with temperature scale 50 is assembled, secured or locked to knob 10 with one or more screws 55 via curvilinear slots 80. Temperature scale 50 can be configured to display any desired temperature range in either degrees Celsius and/or degrees Fahrenheit. Knob 10 comprises an optional center indicator strip 60 and an "OFF and PILOT" indicator strip 65. "OFF and PILOT" indicator strip 65 is in one fixed position on bezel 15. Indicator strip 65 may also show only the word "PILOT" to suit specific applications.

Figure 3:
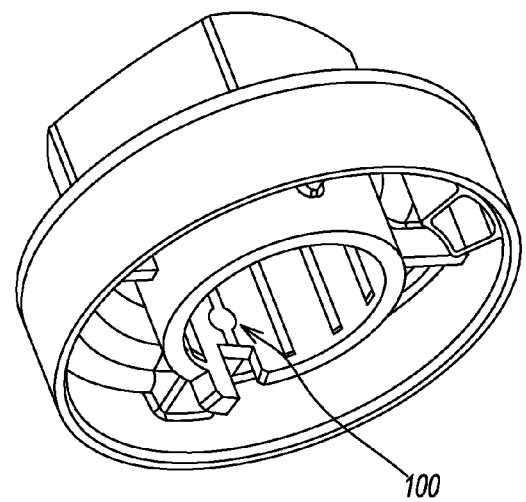
FIG. 3 is a perspective view of the calibratable knob assembly of FIG. 1 and an adjustable control device.

Referring to FIG. 4, adjustable control device 14 has a knob 75 that is attached to a rotatable shaft or stem 70 of adjustable control device 14. The rear of calibratable knob assembly 12, seen clearly in FIG. 2, has a complimentary or mating configuration to a knob 75 of adjustable control device 14. Knob 10 has an internal female hub that is splined and mates with the externally splined profile of control knob 75 of adjustable control device 14. To this end, knob socket 30 of knob 10 comprises a plurality of spline ribs that mate with a like plurality of spline grooves on knob 75. Referring to FIGS. 2-4, a tapped hole 100 is located in a rim 105 of knob 10 to be in alignment with a pilot hole 110 in knob 75. Knob 10 is secured to knob 75 with a set screw (not shown) via tapped hole 100 and pilot hole 110. This allows an operator to rotate knob 75 by rotating knob 10. This allows calibratable knob assembly 12 and knob 75 to be securely attached and properly aligned with one another.

During the calibration process, bezel 15 is secured to knob 10 using screws 55. Screws 55 pass through curvilinear slots 80 and screw into mating screw holes (not shown) in knob 10. When screws 55 are loosened, bezel 15 and temperature scale 50 can be rotated about ±10 rotational degrees or in a range of 20 degrees of rotation which is equivalent to about ±17° Fahrenheit (or a range of 34°) on temperature scale 50 for this application. The exact amount of rotation and corresponding calibration shift may vary depending on the particular application.

Figure 5:
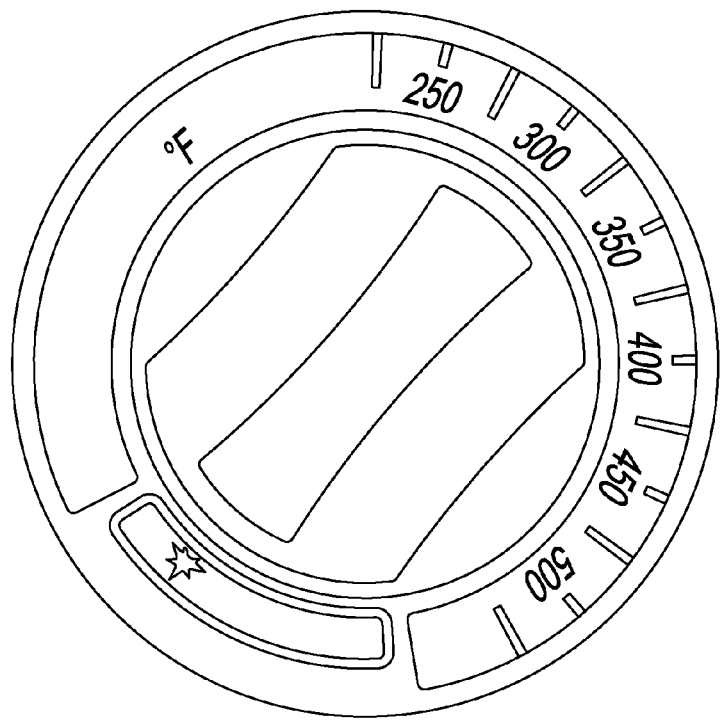
FIG. 5 is a front view of the knob assembly of FIG. 1.

Referring to FIGS. 1, 4 and 5, knob 10 and bezel 15 are secured to one another. The oven is turned on and knob assembly 12 is turned to a predetermined calibration temperature, typically 400° F. In this embodiment, the reference marker is circle 120 on adjustable control device 14 in FIG. 1. That is, the 400° F. position on temperature scale 50 is now aligned with circle 120. Oven temperature readings are taken with a probe. If the oven temperature at steady state is 400° F., knob assembly 12 is calibrated. If the probe reading is 405° F., knob assembly 12 is rotated counterclockwise to indicate approximately 395° F. to cool the oven by 5° F. When the temperature probe reading is 400° F., bezel 15 is loosened and rotated clockwise to indicate 400° F. Bezel 15 is then secured to knob 10 with screws 55. Through this method, the adjustable control device in this embodiment is calibrated. In other embodiments the reference marker can be located in another stationary place on the cooking appliance or on the knob itself.

The data below in Table 1 supports the finding that knob assembly 5 of the present disclosure is calibratable with adjustable control device 70 and ±10 rotational degrees is equivalent to about ±17 temperature degrees F. The table data was obtained as follows. Bezel 15 was loosened, positioned at the mid point of its rotational range and then secured to knob 10. Knob assembly 12 is then set to each of the temperatures listed in the column labeled Nominal SIT Dial Marking. The recorded oven temperatures are listed in the right hand column labeled Oven Temperature in average conditions. For each of the temperatures 250, 300, 350, 400, 450 and 500° F., three temperature readings are taken. For example, the procedure at the 400° F. nominal first set knob assembly 12 to 400° F. The recorded temperature was 400° F. Bezel 15 was loosened, rotated counterclockwise to its angular extreme and then secured to knob 10. Knob assembly 12 was then positioned to 400° F. The recorded temperature was 385° F. Then bezel 15 was again loosened, rotated clockwise to its other angular extreme and then secured to knob 10. Knob assembly 12 was then positioned to 400° F. The recorded temperature was 415.5° F. This demonstrates that bezel 15 has a temperature adjustment range of about 30° F. The same procedure was performed at each of the other temperatures 250, 300, 350, 450 and 500° F.

TABLE 1

Data Relating to Calibration of SIT Oven Knob

| Nominal Over-SIT Dial Marking | Low Calibration Dial Marking | High Calibration Dial Marking | SIT Control Rotational Position (deg.) | Oven Temp in Average Conditions (° F.) |
|---|---|---|---|---|
| | 250° F. | | 146.3 | 232.5 |
| 250° F. | | | 155.0 | 250.0 |
| | | 250° F. | 163.8 | 267.5 |
| | 300° F. | | 171.9 | 283.5 |
| 300° F. | | | 180.5 | 300.0 |
| | | 300° F. | 188.9 | 316.0 |
| | 350° F. | | 198.5 | 334.0 |
| 350° F. | | | 207.2 | 350.0 |
| | | 350° F. | 216.0 | 366.0 |
| | 400° F. | | 226.6 | 385.0 |
| 400° F. | | | 235.1 | 400.0 |
| | | 400° F. | 244.0 | 415.5 |
| | 450° F. | | 255.6 | 435.5 |
| 450° F. | | | 264.2 | 450.0 |
| | | 450° F. | 272.9 | 464.6 |
| | 500° F. | | 282.5 | 480.5 |
| 500° F. | | | 291.4 | 495.0 |
| | | 500° F. | 300.1 | 509.0 |

In an alternate embodiment, a linear temperature indicator could be tied via a linkage to the rotational motion of the adjustable control device. In this embodiment, the knob and linear temperature scale is arranged for relative motion for calibration purposes.

The embodiments of the present disclosure having been thus described with particular reference to the preferred forms thereof, it will be obvious that various changes and modifications may be made therein without departing from the spirit and scope of the present embodiments as defined in the appended claims.

What is claimed is:

1. A method of calibrating a knob and a temperature scale with an adjustable control device that controls heating of a cooking appliance, said method comprising:
    securing said knob and said temperature scale to a rotatable element of said adjustable control device so that moving said knob also moves said temperature scale and said rotatable element;
    setting said knob and temperature scale to a predetermined temperature;
    then heating said cooking appliance;
    measuring a temperature of said cooking appliance;
    when said measured temperature reaches a steady state temperature, determining if said steady state temperature is equal to said predetermined temperature;
    if said steady state temperature is not equal to said predetermined temperature, moving said knob and temperature scale to heat or cool said cooking appliance until said steady temperature is equal to said predetermined temperature; and
    moving one of said temperature scale and said knob relative to the other to said predetermined temperature on said temperature scale.

2. The method of claim 1, wherein said knob and temperature scale are moved by an amount about equal to a difference between said steady state temperature and said predetermined temperature to heat or cool said cooking appliance.

3. The method claim 1, further comprising loosening said temperature scale relative to said knob before said moving step; and securing said knob and said temperature scale to one another after said moving step.

4. The method of claim 1, further comprising an indicator that is fixed relative to said knob and said temperature scale and said adjustable control device.

5. The method of claim 4, wherein said indicator is located on said adjustable control device.

6. The method of claim 1, wherein said temperature scale is located on an annular disc and one of said knob and said annular disc is rotatable relative to the other when loosened, and wherein said knob and annular disc are rotatable together when secured to one another.

7. The method of claim 6, wherein said temperature scale has an amount of angular rotation in a range from about 10 degrees to about 30 degrees.

8. The method of claim 1, further comprising turning said cooking appliance on so that said adjustable control device controls a heating system of said cooking appliance to heat and cool said cooking appliance.

9. A knob assembly comprising:
    a knob comprising a handle portion and a hub portion, wherein said hub portion comprises a control element receiving socket at an outer end of said knob capable of transmitting an applied load, and wherein said handle portion comprises a cylindrical base and an indented blade portion capable of receiving said applied load;
    a member coupled to said knob, wherein one of said knob and said member is movable relative to the other; and
    a temperature scale that is located on a surface of said member, that has a temperature range and that is movable with respect to a reference marker to calibrate said temperature range.

10. The knob assembly of claim 9, wherein said member is an annular disc.

11. The knob assembly of claim 10, further comprising at least one curvilinear slot that faces said outer end and at least one screw that extends through said curvilinear slot to lock and unlock said annular disc to said knob, wherein said annular disc when unlocked is rotatable with respect to said knob in an angular range determined by a size of said curvilinear slot.

12. The knob assembly of claim 11, further comprising at least one additional curvilinear slot that faces said outer end and at least one additional screw that extends through said additional curvilinear slot, wherein said one screw and said additional screw lock and unlock said annular disc to said knob.

13. The knob assembly of claim 10, wherein said surface of said annular disc comprises a bezel.

14. The knob assembly of claim 13, wherein the bezel is manufactured from cast aluminum.

15. The knob assembly of claim 9, wherein the handle portion is manufactured from phenolic.

16. The knob assembly of claim 9, further comprising an adjustable control device that includes a control element that is a force transmitting element; and a set screw that positively locks said knob to said control element of said adjustable control device.

17. The knob assembly of claim 16, wherein said control element comprises a knob that is locked to a rotatable stem of said adjustable control device.

18. The knob assembly of claim 9, wherein said reference marker is located on one of an associated cooking appliance and said knob.

* * * * *